US011087318B1

(12) United States Patent
Catoe et al.

(10) Patent No.: US 11,087,318 B1
(45) Date of Patent: Aug. 10, 2021

(54) SYSTEM AND METHOD FOR ELECTRONIC COUPONS

(71) Applicant: ECR Software Corporation, Boone, NC (US)

(72) Inventors: Peter Terry Catoe, Boone, NC (US); Burt Aycock, Boone, NC (US); Mark Noble, Boone, NC (US); Matthew James Mellon, Boone, NC (US)

(73) Assignee: ECR Software Corporation, Boone, NC (US)

( * ) Notice: Subject to any disclaimer, the term of this patent is extended or adjusted under 35 U.S.C. 154(b) by 0 days.

(21) Appl. No.: 16/993,002

(22) Filed: Aug. 13, 2020

Related U.S. Application Data

(63) Continuation-in-part of application No. 14/496,602, filed on Sep. 25, 2014, now abandoned.

(60) Provisional application No. 61/882,372, filed on Sep. 25, 2013.

(51) Int. Cl.
| | |
|---|---|
| *G06Q 30/00* | (2012.01) |
| *G06Q 20/38* | (2012.01) |
| *G06Q 20/18* | (2012.01) |
| *G06N 5/02* | (2006.01) |
| *G06Q 30/02* | (2012.01) |
| *G06Q 20/20* | (2012.01) |

(52) U.S. Cl.
CPC ........... *G06Q 20/387* (2013.01); *G06N 5/025* (2013.01); *G06Q 20/18* (2013.01); *G06Q 20/20* (2013.01); *G06Q 30/0224* (2013.01); *G06Q 30/0237* (2013.01)

(58) Field of Classification Search
CPC ...... G06Q 20/387; G06Q 20/18; G06Q 20/20; G06Q 30/0224; G06Q 30/0237; G06N 5/025
See application file for complete search history.

(56) References Cited

U.S. PATENT DOCUMENTS

| | | | |
|---|---|---|---|
| 3,878,365 A | 4/1975 | Schwatlz | 235/61.7 R |
| 5,083,638 A | 1/1992 | Schneider | 186/61 |
| 6,047,262 A | 4/2000 | Lutz | 705/16 |
| 6,080,938 A | 6/2000 | Lutz | 177/25.15 |
| 7,044,370 B2 | 5/2006 | Bellis, Jr. et al. | 235/383 |
| 7,114,656 B1 | 10/2006 | Garver | 235/462.46 |
| 7,337,960 B2 | 3/2008 | Ostrowski et al. | 235/383 |
| 7,387,241 B2 | 6/2008 | Hassenbuerger | 235/383 |
| 7,416,117 B1 | 8/2008 | Morrison | 235/383 |
| 7,648,064 B2 | 1/2010 | Lamparello et al. | 235/382 |
| 7,673,796 B2 | 3/2010 | Kobres et al. | 235/383 |
| 7,909,248 B1 | 3/2011 | Goncalves | 235/383 |
| 8,386,309 B2 | 2/2013 | Thibedeau | |
| 8,556,181 B2 | 10/2013 | Twiste | 35/470 |
| 8,657,196 B2 * | 2/2014 | Olmstead | G07G 1/0045 235/462.01 |
| 9,773,255 B2 | 9/2017 | Circe | |

(Continued)

*Primary Examiner* — David J Stoltenberg
*Assistant Examiner* — Michael I Ezewoko
(74) *Attorney, Agent, or Firm* — MacCord Mason PLLC (57) ABSTRACT

Improved checkout systems, apparatuses and methods for managing electronic coupons include a checkout kiosk, a point-of-sale system and a microprocessor with an electronic rules engine. The electronic rules engine is configured to allow application of electronic coupons to customer accounts internally to the point-of-sale system. Redemption of the electronic coupons is allowed by the consumer at the kiosk without a scan-able artifact.

15 Claims, 4 Drawing Sheets

(56) References Cited

U.S. PATENT DOCUMENTS

| | | | |
|---|---|---|---|
| 10,290,009 B2 * | 5/2019 | Thomas | G06Q 30/0224 |
| 2003/0018897 A1 | 1/2003 | Bellis, Jr. et al. | 713/182 |
| 2005/0055270 A1 | 3/2005 | Broe | |
| 2006/0080177 A1 | 4/2006 | Walter et al. | 705/23 |
| 2006/0265281 A1 | 11/2006 | Sprovieri | |
| 2008/0061139 A1 | 3/2008 | Roquemore | 235/383 |
| 2009/0039164 A1 | 2/2009 | Herwig et al. | 235/462.41 |
| 2009/0134221 A1 | 5/2009 | Zhu et al. | 235/383 |
| 2009/0188975 A1 | 7/2009 | Fergen et al. | 235/385 |
| 2012/0187194 A1 | 7/2012 | Svetal et al. | 235/470 |
| 2012/0205448 A1 | 8/2012 | Hoskinson et al. | 235/440 |
| 2013/0020392 A1 | 1/2013 | Olmstead et al. | 235/440 |
| 2013/0085835 A1 * | 4/2013 | Horowitz | G06Q 30/0207 |
| | | | 705/14.38 |
| 2013/0086484 A1 | 4/2013 | Antin | |

\* cited by examiner

SYSTEM AND METHOD FOR ELECTRONIC COUPONS

This application is a Continuation-In-Part of application Ser. No. 14/496,602 filed Sep. 25, 2014, which claims the benefit of U.S. provisional Application No. 61/882,372 filed Sep. 25, 2013, which is incorporated herein by reference in its entirety.

BACKGROUND

The present disclosure relates generally to electronic coupons, and more particularly to systems and methods for managing electronic coupons at a point-of-sale (POS) checkout kiosk, for example, retail checkouts, unattended self-checkout, scan portals and pay station environments.

In a retail type environment, the efficiency with which consumers are able to process, pay for, and purchase their desired items factors into the expenses for a retail type establishment. The labor hours attributable to manning checkout counters contributes greatly to this expense. In a typical retail operation, a shopper gathers the items desired for purchase and presents them at a checkout counter, a clerk then scans or enters the items' barcodes, and the POS system totals the shopper's bill. The clerk may apply any promotional discounts to the bill, the shopper tenders payment, and the items may be bagged for the customer. The discounts applied, for example, include loyalty discounts and consumer coupons.

Toward reducing operating expenses, some businesses have implemented self-checkout counters. Self-checkout terminals are systems which are operated mainly by a customer without the direct aid of a dedicated checkout clerk. In such a system, the customer selects individual items for purchase, scans them across a scanner or screen and then places the selected items into a grocery type bag, if desired. This continues iteratively for the remainder of the items to be purchased. The customer then typically pays for his or her purchase either at the self-service checkout terminal or a paystation. Thus, a traditional self-service checkout terminal permits a customer to select, apply discounts, and to ring up and pay for his or her purchases without the direct assistance of dedicated retailer personnel at each individual checkout terminal.

Self-checkout systems are also useful in other types of unattended environments, such as employee break rooms, hotel vending areas, business lobby settings or hospitals. One of the many benefits of self-checkout systems is that they allow quick consumer-operated transactions, resulting in high throughput. Diminishing the throughput due to problems with processing of transactions and/or transaction discounts, such as coupons, is detrimental to business and may defeat the implementation of self-checkouts.

In other examples, hybrid checkout scenarios are also being created, where technologies such as scan tunnels and paystations create a checkout that is not the traditional fully attended checkout and is not the unattended self-checkout but is designed to greatly increase checkout speed. Scan tunnel technology has been introduced that allows the consumer to place the items to be purchased on a conveyor belt. The conveyor belt carries the items through a scan tunnel that automatically scans the items, relieving the consumer and/or attendant of this responsibility. Consumers no longer need scan each item and attendants are freed up to assist with bagging the purchased items and attending to exceptions occurring during the checkout process. Exceptions are delays to the transaction, such as for example, tending to a coupon that did not scan properly or did not get properly added to the transaction.

Centralized pay stations allow consumers to more quickly move through a transaction at a checkout, for example a hybrid type self-checkout. Customers from several checkout stations pay at a common pay station. One attendant can manage the pay station, freeing other attendants to focus on bagging and exception handling. Problems with applying coupons at such pay stations could bottleneck the checkout process and discourage users from these newer types of checkout scenarios.

While advancements in various types of checkout stations increase speed and throughput at the checkout station, they can create greater challenges in processing items, such as when processing consumer coupons, especially when there is less attendant oversight. Electronic coupons have developed as a way to eliminate usage of paper in printing consumer coupons. Electronic coupons have assisted in lowering distribution costs through the use of electronic communication channels, improving the accuracy of delivery and consumer reception by using consumer-specific communication addresses, such as email, and improving the accuracy and efficiency of permission marketing by using electronic opt-out functionality. However, electronic coupons present their own set of problems, with which many retailers and consumers continue to struggle.

Abuse and counterfeiting of electronic coupons, transitioning of the POS to accept electronic coupons, manual labor required to issue and distribute electronic coupons and low redemption rate remain examples of challenges associated with retailers' use of electronic coupons. Applicant's inventions address these and other challenges in the art.

SUMMARY

The disclosed inventions fulfill one or more of these needs in the art by providing apparatus, systems and methods for improved management of electronic coupons at the POS, thus increasing the speed and efficiency as consumers complete transactions at checkout stations. Some improvements may be equally beneficial at traditional checkouts, hybrid checkouts and self-checkout environments.

In one example, a checkout system includes a checkout kiosk having a housing, a customer interface and a customer unloading station, a POS system having a microprocessor and an electronic coupon rules engine with programming configured to allow application of electronic coupons internally to the POS checkout system and redemption of the electronic coupons by the consumer at the kiosk without requiring a scan-able artifact of the coupon. In one embodiment, the checkout system may be a self-checkout kiosk. In another embodiment, the checkout system may be a conventional or hybrid checkout kiosk.

In some embodiments, the electronic coupon rules engine further includes a relational module that associates an electronic coupon selection with a customer record based upon historical transactions to create a coupon association and detachment record for a customer within the point-of-sale system.

The checkout system may also include a series of coupon/discount triggers. The triggers may be selectable and/or configurable by the retailer. At least a portion of the coupon triggers may be selectable and/or configurable by the customer.

In another embodiment, a closed-loop system for managing electronic coupons includes a POS checkout system having a store database, wherein the store database includes a transactions function, a customer record function, and an e-coupon function. The system also includes an electronic coupon rules engine in communication with the POS checkout system. The electronic coupon rules engine executes electronic coupon triggers and associates an electronic coupon with a consumer account within the POS system. The engine also internally monitors the applicability of the associated electronic coupon to the consumer account. Also included in this example may be a communication component for informing a consumer about an associated electronic coupon and a redemption component for applying the electronic coupon to a consumer transaction. Some control of setting triggers for electronic coupons may be allowed to pass to customers.

The system for managing electronic coupons may be used in conjunction with a third party electronic coupon system.

These and other aspects of the disclosed inventions will become apparent to those skilled in the art after a reading of the following description of the preferred embodiment when considered with the drawings.

DESCRIPTION OF EXEMPLARY EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms. It will be understood that the illustrations are for the purpose of describing an exemplary embodiment of the invention and are not intended to limit the invention thereto.

Retailers prefer to be as productive as possible during the checkout process. For this reason, retailers are most challenged to provide speed, accuracy and productivity collectively within the checkout process. Coupons are widely used by consumers and may draw consumers to particular retailers. However, advancements associated with checkout transactions, such as electronic coupons, often come with challenges and hurdles to their implementation that may affect the speed, accuracy, productivity and/or customer satisfaction.

By way of example, one challenge associated with electronic coupons is preventing coupon abuse, where a consumer may exceed the coupon use limits. Additionally, consumers often have difficulty finding coupons in order to use them at the time of the transaction, for example, finding them on their smart phone or remembering to bring the coupon they printed to the store for their purchase. Many POS systems still require a scan-able artifact (such as paper or smartphone screen), even for electronic coupons. In some cases, a scan-able artifact may be a code that can be entered from a coupon or otherwise scan-able coupon. Electronic coupons have become popular and have reduced paper usage and waste, however, unacceptable investment of manual labor may be still required for retailers to internally issue electronic coupons for specific events, to issue coupons on a recurring schedule and/or to distribute and maintain the electronic coupons, so as to maximize the coupon benefit and usage. Electronic coupon maintenance is difficult and often is outsourced to third parties. There remains substantial cost involved in having third party companies analyze consumer behavior and eligibility to receive coupons, as well as to have them distribute the coupons. Further, outdated electronic coupons are difficult to monitor and control by outside third parties, who are outside of the POS system. Despite this, the trend is to externalize management of electronic coupons to third parties with complicated networked and expensive systems.

Applicant's inventions allows internalization of functions and components to the retailer's checkout system so that the challenges associated with electronic coupons are minimized and retailers may keep maintenance of electronic coupons in-house with their POS system. In one example, a checkout system, generally designated 10, includes a checkout kiosk 11, including a housing 15, a customer interface 20 and a customer unloading station 17, a POS system 50 (see FIG. 2) having a microprocessor and an electronic coupon engine 68 (see FIG. 3) with programming configured to allow application of electronic coupons internally to the POS checkout system.

Figure 1:
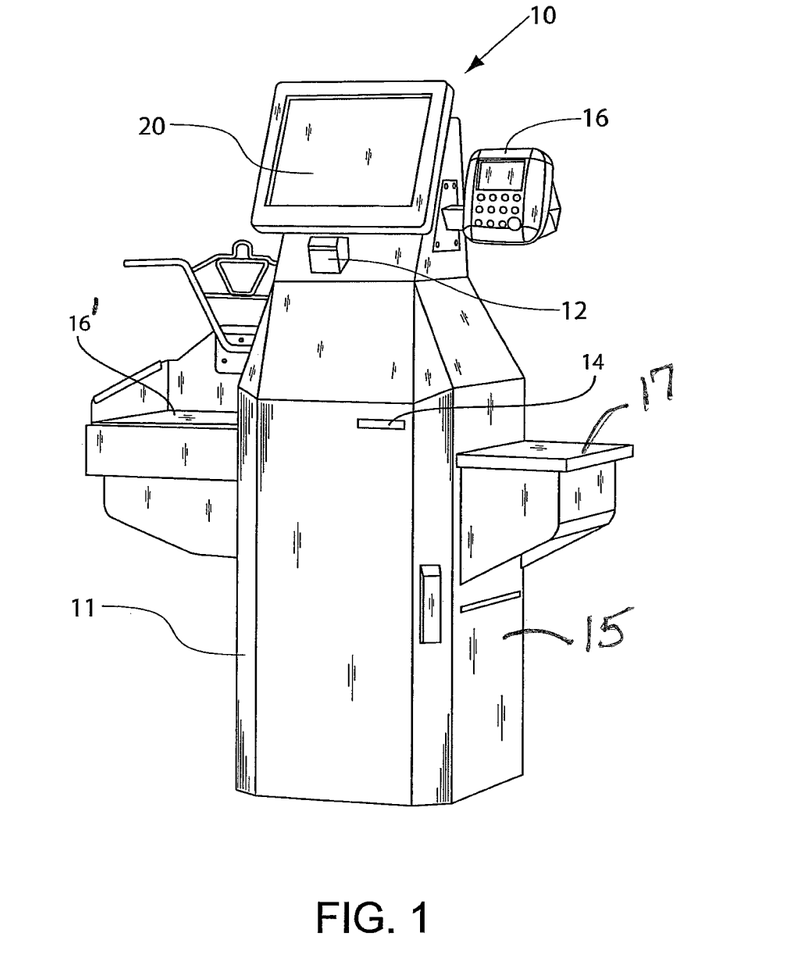
FIG. 1 is a front perspective view of one example of a self-checkout system kiosk.

The checkout system 10 may be a traditional checkout and in other examples may be, but is not limited to, a self-checkout, a hybrid-type scan tunnel checkout and/or a checkout paystation. FIG. 1 shows one example of an automated self-checkout system 10. Typically, self-checkout systems include one or more checkout kiosks 11. The kiosk 11 usually includes a housing 15, which generally accommodates or houses some of the other aspects of the self-checkout system 10, which may include the POS system 50 and electronic coupon engine 68. Alternatively, the POS system 50 and engine 68 may be remote from the housing 15, but with communication links to the housing 15. The housing 15 may be a pre-existing structure at the installation site of the self-checkout system, may resemble the housing as shown in FIG. 1, or may take on other shapes able to accommodate the other aspects of the invention.

Figure 2:
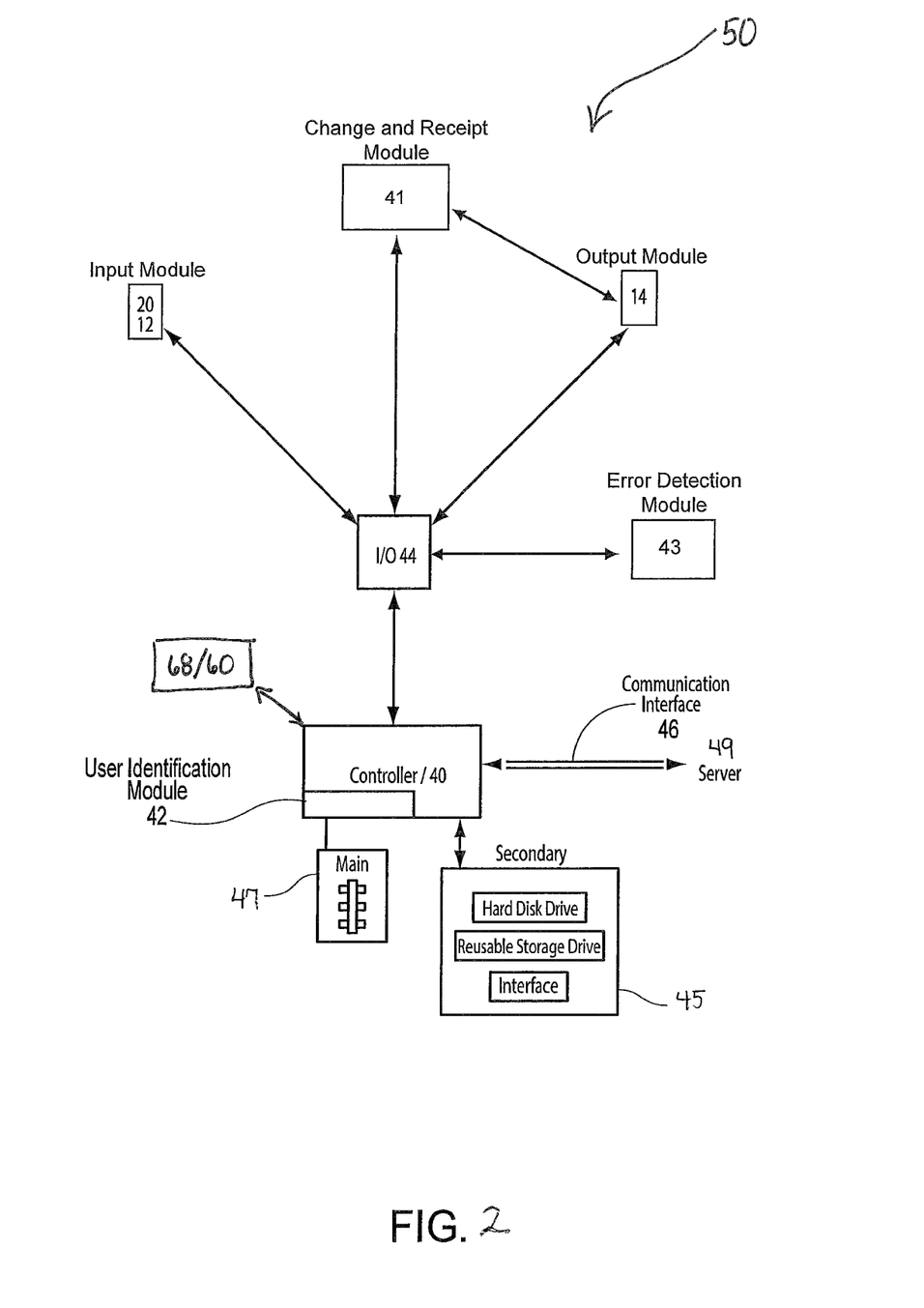
FIG. 2 is a schematic diagram showing one example of the inputs, outputs and control system associated with a point-of-sale system of a checkout kiosk.

As in FIG. 1 and shown schematically in FIG. 2, the kiosk 11 may also include input modules 12, output modules 14 and transaction modules 16. The input module 12, as seen in FIG. 1 may be, for example, a coupon-in center, credit/debit card reader, or a payment center. The input module 12 may typically be supported on, integral to, or attached to the housing 15. Input module 12 is arranged to accept input about or for the transaction, for example, from items being purchased by recognizing the item, such as through selection on the display 20 by the customer or by recognition of an identification or code. A bar code scanner would be another example of an input module 12 suitably found in the kiosk. Other examples, inter alia, may include one or more keypads to key in information, RFID reader, a microphone (potentially with voice recognition software), a touch screen keypad, a video camera, tablet computer, wireless communication receiver, a credit card reader, a debit card reader, a smart card reader, a loyalty card scanner, a cash receiver a wireless transmission, a mobile phone, and/or any of these in combination. The input and output modules of the kiosk 11 correspond to inputs and outputs of the point of sale system 50.

Output module 14, may include a coin-out center, a cash-out center and/or a receipt dispensing center. Output module 14 is arranged to provide and receive information during a transaction. Output module 14 may provide instructions to the purchaser or provide feedback from input received through input module 12. For example, the identification and recorded price of scanned items may be displayed to the customer on display 20. In the case of a touch screen display, purchasers may also input information on display 20 making the display serve as both a part of the input module 12 and output module 14. A speaker (not shown) may also serve to provide audio information to consumers. Other examples of output module 14 may include a private printing page, a link transmitting to a handheld device such as a mobile phone or tablet computer or the like.

Transaction module 16 may include centers accommodated by housing 15 where parts of the transaction occur, such as the bagger 16, and potentially an auxiliary bagger. Transaction module 16 may also include, by way of example, weigh centers, bumper guards or transaction shelving centers.

A checkout system 10 may further include a POS computer system 50. The POS computer system may include a microprocessor/controller 40, operatively connected to the input module 12 and output module 14. The controller 40 has POS programming arranged to process information from the input module 12, such as the items being purchased in the transaction, and to provide information through output module 14 to the customer to allow completion of a customer transaction through system 10.

A controller 40, such as a microprocessor, may be, for example, in the kiosk or store database computer, and usually includes an associated memory. The controller 40 connects through input/output ports 44 in order to receive information from and to provide information to the modules included in the kiosk. By way of example, the controller 40 receives information from the input module 12 and provides data to the output module 14. The controller may have a clock component so that elapsed time between events can be determined. Other configurations of timers can be used.

Shown in FIG. 2, the POS computer system 50 may include a main memory 47 or a secondary memory 45, or both, that may communicate with the controller 40. The main memory is generally a random access memory (RAM) that may include an item buffer for temporarily holding identification information corresponding to scanned items before the items are verified by the kiosk. On the other hand, the secondary memory with standard input/output ports may include any storage medium such as but not limited to a hard disk drive, a SCSI drive, a removable storage drive or removable storage units and interface. Alternatively, the secondary memory may include handheld computing devices, as well as one or more databases, such as a look-up database that includes SKU number, price, item codes, tolerance range for the item or for a class of items, and corresponding weight, height, length, or width for each item in the store. This database may reside on one or more of different or additional computers such as at a central store server 50 or a remote server outside of the location.

Additionally, it is contemplated that the kiosk may not include a main memory. In this situation, the controller may communicate with the secondary memory 45 which may be at a remote server, for example, accessed via local area network or global networking such as the Internet or Intranet, and refresh a display screen with information and software stored in the remote server.

Traditional checkouts and self-checkouts are typically located at retail stores, such as grocery stores. Unattended vending self-checkout systems may reside in employee break rooms or hospitals where staggered lunch shifts and work breaks cause several massive influxes of consumers at specific times throughout each work day. These influxes cause lines to form at the kiosks. It is not unusual for many of the consumers to have prepaid cards with stored value that is decremented with each purchase, and which the consumer may increment at their choosing using cash or credit at the kiosk.

Hybrid checkout technology may be made up of an Automated Scanning Device (ASD) station and/or a pay station, which may exist together or independently of each other and together or independently of more traditional checkout components. The consumer loads the merchandise he or she wishes to purchase onto a conveyor belt, which conveys the item through the ASD, where it is automatically scanned. As the item is conveyed out of the ASD, the attendant bags the item. Once all items are bagged, the consumer may proceed to an unattended pay-station. There, the consumer can resume the transaction and scan or accept any corresponding vendor coupons, store coupons, as well as scan, enter, and/or project RFID to associate their customer identifier, which provides any other additional benefits offered to the consumer such as special pricing or loyalty rewards. Additionally, the consumer can also make changes to their account such as selecting options to receive their receipts by way of email, selecting options to opt out of printed receipts, opt in for marketing specials, and update their mailing and email address. One example of a scan tunnel is seen in U.S. patent application Ser. No. 12/283,439 to Zhu as published U.S. Patent Publication 2009/0134221, the Zhu application being incorporated herein in its entirety. Yet another example of a scan tunnel checkout is the Jade Portal Scanner offered by Datalogic ADC, Inc., of Eugene, Oreg.

Figure 3:
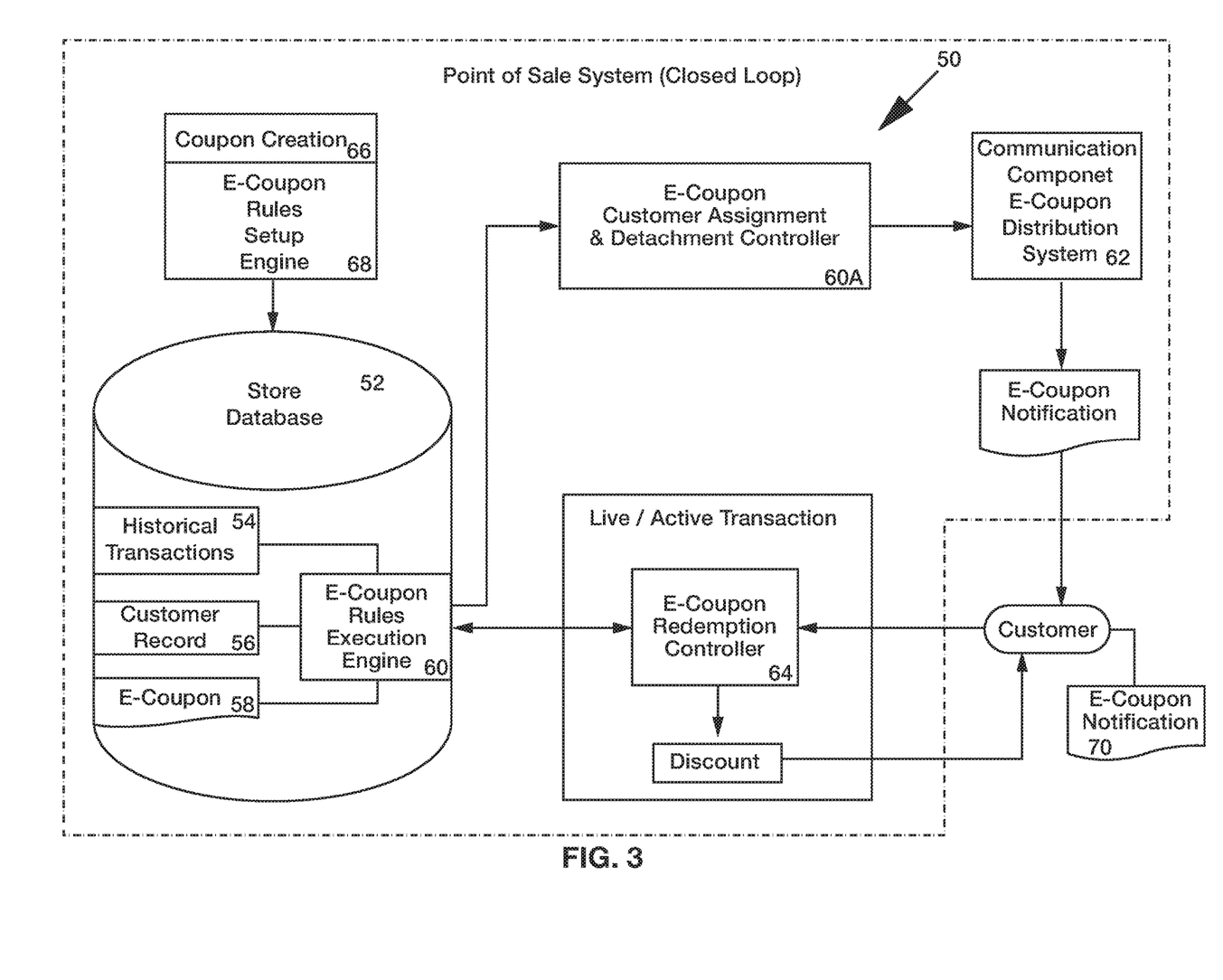
FIG. 3 is a block illustration of an example of a point-of-sale system in communication with an electronic rules engine according the present disclosure.

As seen in FIG. 3, Applicant's checkout system allows internal control, along with the POS system 50, of electronic coupons, regardless of the checkout scenario and includes an electronic coupon rules engine 68 for setting up coupon triggers and rules exceptions. The electronic coupon rules engine 68 is generally in communication with the store database 52 and includes programming configured to allow application of the electronic coupons internally within the POS checkout system 50. The electronic coupon rules engine may be integral with the store database (located in item 40, 45 or 47) or in remote communication with the store database at a server 49. Internal control of the electronic coupons allows retailers to control distribution of the coupons and also provides the option to let consumers opt-in for receiving electronic coupons. Further, if the retailer desires, the internal electronic coupon control allows the retailer the flexibility of the option of allowing consumers to control electronic coupon notifications, as-well-as the types of coupons they prefer to receive.

Figure 4:
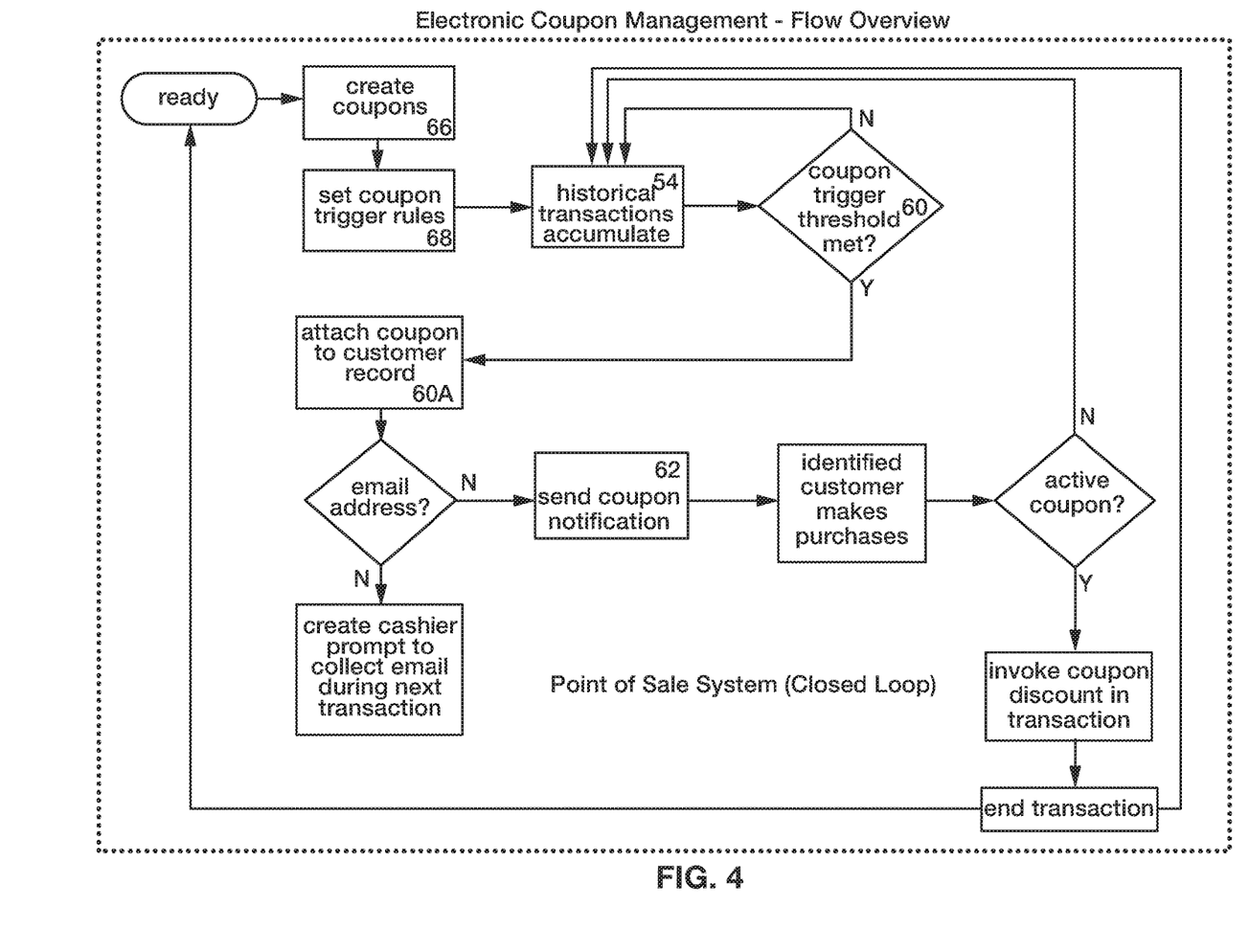
FIG. 4 is a flow chart illustration of an example of a customer transaction at a kiosk with an electronic coupon rules engine with programming configured to allow application of electronic coupons internally to a point-of-sale system.

In one example, shown in FIGS. 3 and 4, a closed-loop system for managing electronic coupons includes a POS checkout system 50 having a store database 52, wherein the store database includes a transactions function 54, a customer record function 56 and an e-coupon function 58. An electronic coupon rules engine 68 identifies coupons to be associated with customer accounts. The system also includes an electronic coupon rules execution engine 68 in communication with the POS checkout system 50. The electronic coupon rules engine 68 is in communication with or includes the electronic coupon rules execution engine 60 which executes electronic coupon triggers and associates an electronic coupon with a consumer account within the Customer Assignment/Detachment Controller 60A. The engine 60 also internally monitors the applicability of the associated electronic coupon to the consumer account. Also included in this example is a communication component 62 for informing a consumer about an associated electronic coupon and a redemption component 64 for applying the electronic coupon to a consumer transaction.

In operation, in this example, a retailer creates or recognizes desired coupons 66 and sets up electronic coupon rules options in an E-coupon rules set up engine 68 and in the electronic coupon rules execution engine 60. The electronic coupon rules engine 60 has access to at least the historical transactions data 54, the customer record 56 and the available electronic coupons 58. The transactions may be, by way of example, for general groups or for groups within the store as cumulative data and/or individual consumer transactions. The customer record 56 may include data individual to each consumer, for example a birth date or consumer preferences. The electronic coupons 58 are associated with individual consumers based upon matches between the coupons and the customer history found in the store database 52. Since the coupons are associated with the customer account, the coupons are not able to be counterfeited by consumers. The consumer is notified about the electronic coupons associated with the consumer account 62, for example by email and/or text. The consumer may also be made aware of available electronic coupons associated with their account when he or she checks out such as on the output module 14 or display 20. The consumer may choose to redeem their electronic coupon at checkout 64. Since the coupon is associated with the consumer account, the consumer need not present a physical coupon, code or barcode on a smart phone for scanning or entering in order to use the coupon. The record of the coupon is inside the POS system and does not rely on the consumer returning an artifact of the coupon to the store. Usage of the coupon at checkout triggers the disassociation of coupons that are no longer available and/or logs usage of the coupon 60A. Coupons that expire without being used are removed from association with the consumer account 64. In some examples, it does not require a $3^{rd}$ party to validate or invalidate coupons for usage, and occurs through the point-of-sale software and closed loop system In one example, the retailer may choose from a desired rules set or may allow a default rules setting. A rule may have a related rule trigger. Once the retailer has selected its desired rules set for triggering electronic coupons, the checkout system components internally perform the ongoing maintenance of the electronic coupons, thus not requiring human intervention and further manual labor investment.

In one example, a coupon trigger may be a schedule trigger with an eligible time/date range for redeeming the coupon that activates the start date and expires the coupon on the end date by detaching it from the customer record.

Another coupon trigger may be a use limit. A use limit is a numeric value set by the merchant that specifies the number of times the coupon can be redeemed within the eligible time period.

Ineligible items may have an ineligible items trigger. Ineligible items allows the merchant to designate certain items as ineligible for the coupon discount, such as low-margin items, or regulated items such as alcohol or tobacco.

Another coupon trigger may be a minimum or maximum purchase. A minimum purchase lets the merchant require a certain low-side dollar total for the transaction total before allowing the e-coupon discount to be triggered. The maximum purchase trigger lets the merchant put a high-side limit on the dollar total of a transaction, so that the discount will not keep applying if the transaction exceeds the limit. It can also be set to apply only to the dollar portion of the transaction. Additionally, a flag item trigger may be set so that flagged items do not count toward a minimum or maximum threshold requirement/limit.

A tiered discount based on a total purchase may be a discount trigger. A tiered discount includes discounts, by way of example, where spending $0-$50 gets the customer 10% off, spending $50-$100 gets 15%, and so on.

Discount/coupon triggers may include a recurring trigger. A recurring trigger lets the merchant offer the same coupon for subsequent time periods, such as a 10% Off every calendar month, to be used only once by each consumer.

Deferrable triggers may be included where the consumer is given the option to use their discount in the current transaction (such as when they make a large grocery purchase), or to save it for later (such as when they are buying only a very few items and don't want to use the discount on a small transaction). The cashier may be automatically prompted by the system if there is an active e-coupon attached to the consumer associated with the current transaction. The prompt communicates the important details, such as how much the discount is for, how many days remain to use it before it expires, and whether or not it rolls over to next week, month, quarter, etc. if the customer does not use it. The merchant also has the option to put the prompt on an interactive consumer-facing device, such as PIN pad or touch screen display, so that the consumer can answer the questions directly, instead of requiring the cashier to do so.

In another example, a discount trigger may include an optional rollover trigger that gives the merchant the ability to let coupons rollover if consumers do not use them by the end of the designated time period. Including such triggers not only allows the retailer internal control of coupons associated with their point of sale system, but also gives the customer a sense of control over the use of the coupons and discounts. In some examples, rather than serializing bar codes, or handling paper coupons, the system attaches coupons to the customer record and removes them once they have reached their use limits.

In some examples, a trigger may be a coupon giveaway. A coupon giveaway typically allows consumers to give their coupons away via any or limited channels (email, SMS, social media, etc.) to another person. The checkout system tracks the giveaway coupon scan code with an additional string that identifies it as a coupon that has been given away, by whom, and to whom (if applicable). In some instances, the coupon giveaway may be a "donate to charity" feature allowing consumers to donate the value of unused coupons to charitable entities.

In some embodiments, a multi-channel scope trigger may allow all or some of the triggers to extend to a selection, a series and/or all channels of retail, including brick and mortar, pick-up, delivery, and e-commerce. The system may be a closed loop processing system that does not have to query a third-party web service to enforce use limits, which is typically how other systems prevent coupon over-usage abuse.

A date trigger may be included to let merchants set up coupons (or give extra loyalty points) to be automatically set to be delivered on specific dates, such as customer birthdays, holidays, and any other defined dates or date ranges.

A threshold trigger may include multiple variables to act as a trigger, for example, an e-coupon may be automatically sent (or extra loyalty points given) to customers who spend 'x' dollars in a specified timeframe 't'. A percentage trigger may automatically send e-coupons to customers in a percentage range of performance. For example, a certain percentage trigger sends a coupon (or gives extra loyalty points) to a top 10% of revenue producing customers. Also, a percentage trigger can be used for the lowest producing customers, or a range (such as the middle or lowest 20%) in order to encourage the customers to return. In one example, a visitation trigger may automatically send coupons (or give extra loyalty points) to customers who have not shopped in the store in the last 'x' days encourage them to shop again. Category triggers may be included to automatically identify what categories (such as departments or item lines) customers buy from and automatically send them coupons (or gives extra loyalty points) if they rarely or never buy items in specific departments.

A recommended trigger may be included to automatically create e-coupons for certain products as recommended based comparisons between what consumer A purchases, and what others consumers have purchased who also purchased what consumer A purchased. Similarly, a combination trigger may automatically send e-coupons based on specific product combinations. If a customer buys A, B, and C, for example, the coupon creation module 66 may send them a coupon for item D.

In another example, a trigger may be a random promotion trigger. The random promotion trigger is configured to fire randomly within a specified time frame. Random promotions are scheduled and fired randomly by the system based on, typically, 1) quantity and 2) time frame. When selected, a field for quantity will appear where the retailer specifies the number of rewards they want the system to deliver within the associated time frame. The system then randomly selects and marks 'x' points in time within the Promo Schedule where 'x' equals the number of rewards that the retailer pre-defined in the quantity field. The system will then deliver the reward in the transaction immediately following each time marker, provide the transaction meets all of the other conditions pre-defined by the retailer. If no transaction occurs between one time marker and the next, then when the second time marker is reached the next two transactions receive the reward back-to-back. When the Promo Schedule ends, any undelivered rewards become disabled, including rewards where the Promo Schedule is configured to be recurring (i.e. —5 Surprise Discounts Every Sunday 2 pm-5 pm, 25% Off Entire Purchase). That is, if all the rewards are not delivered on a recurring Sunday schedule, the undelivered rewards will not rollover to the following Sunday.

Also, first come, first served (FCFS) promotions may be configured as triggers. FCFS triggers fire within the specified time frame for the first 'x' consumers whose transactions meet the proper conditions. They are configured with the same options used to create other promotions in the system. FCFS promotions are scheduled by the retailer to be given to the first 'x' consumers whose transactions meet all the pre-defined conditions of the transaction, where 'x' is the total number of FCFS promotions pre-defined by the retailer. When selected, a field for quantity will appear where the user specifies the number of FCFS promotions they want the system to deliver within the associated time frame. The system disables the FCFS promotion immediately after the 'xth' one has been given.

Similarly, a Nth Customer trigger may be included. An Nth customer trigger fires for a single consumer within the specified time frame whose transaction number matches the transaction number specified by the retailer. Nth Customer promotions are scheduled by the retailer to be given to the Nth consumer whose transaction number matches the number pre-defined by the retailer and which meets all the pre-defined conditions of the transaction. When selected, a field for quantity will appear where the retailer specifies the exact transaction number for which the associated customer will receive the promotion. The system disables the Nth Customer promotion immediately after it has been given. For example, the 1,000 customer each month receives a bar coded Receipt Promotion for 50% off any transaction up to $200 that must be spent in the next 30 days.

In some embodiments a brand trigger is included. A brand trigger may automatically send e-coupons based on customers' purchasing a particular brand. For example, some suppliers and manufacturers will offer discount incentives in the form of coupons to consumers they determine are purchasing their competition's products.

In another example, outside data triggers may be used to automatically send e-coupons to customers (or gives extra loyalty points). For example, specific discounts/coupons may be sent when customer data is integrated with outside data, such as from the National Weather Service, when certain weather conditions are forecast. More specifically, if the forecast is for snow, coupons can be automatically sent to customers for certain products associated with such weather like hot chocolate, vitamins, shovels, scarves, gloves, etc. Other examples of outside data that can be used to trigger e-coupons include sports scores or sporting event dates to promote team-themed products, or stock fluctuations to promote certain correlated products.

In some examples, the checkout system includes relational components for associating and monitoring electronic coupons and/or triggers with particular consumer accounts. As used herein the terms discount and coupon are interchangeable.

In many examples, the internal application of electronic coupons within a closed loop system allows automation of the electronic coupon process. The triggers, rules and conditions are in the control of the retail merchant using the system. The retailer may opt to allow the consumer to control some electronic coupon options to tailor their participation. This option may create increased customer participation and greater financial return for electronic coupon offerings. For example, a consumer may choose to opt-in for social sharing electronic coupons where a trigger will send either an e-coupon or assign a preset number of loyalty points to customers who have shared a specific email with others using any of the major social networks.

In some examples, the checkout system may allow for some interaction with third party systems. Third party email listings or coupon options may be adopted or added to selected components of the internal system if elected by the retailer. For example, a retailer may want to expose a limited sub-set of the system, such as the trigger rules engine, to a third-party marketing company because they have expertise in consumer behavior analysis. Exposing the brand trigger controls to a third party partner (via a web service interface, for example) would enable the retailer to control the components internally for which they have sufficient knowledge, and to grant access to an external agent to setup e-coupon rules and triggers based on the third party's expertise. Similarly, a retailer may want to use a third-party email service in order to leverage their electronic communication expertise, which might include white listing, design and layout templates, etc.

In some examples, the checkout system of this disclosure may incorporate or work with loyalty points programs.

The invention may also be considered a method of managing electronic coupons in a closed-loop system, including: creating applicable electronic coupons; setting electronic coupon trigger rules; attaching electronic coupons to consumer accounts in a POS system; communicating the attached coupons to consumers; and activating an attached electronic coupon to provide a discount to a consumer. The example may also include accumulating a consumer's historical transactions as a relational database. The example may also include allowing consumers to control options for receiving electronic coupons. The example may also include comparing a consumer's historical transactions against the electronic coupon trigger rules.

In another example, Applicant's inventions may be applicable to improvements in traditional attended checkouts and self-checkouts. Also, Applicant's inventions smooth the transition between attended checkouts, traditional self-checkouts and the increased speed and changes to the checkout process occurring at hybrid, for example, scan tunnel and paystation, self-checkout environments.

Digital manufacturer coupons may be used by manufacturers to entice consumers to buy more of their products. Before the digital coupon, manufactures could only print coupons, which was costly, and then would have additional cost associated with distributing the printed coupons to consumers. Once the consumer is in possession of a printed coupon they can redeem the printed coupon at a physical store location, when they physically purchase the associated product and give the retailer the printed coupon. Once the item is purchased and the coupon is tendered, the retailer can then receive settlement money for the coupon by using a coupon clearing house, which handles the reconciliation and redemption back to the retailer. A digital coupon is different, nothing needs to be printed. Instead, with a digital coupon the manufacture will digitally publish coupons and the coupon is available to consumers in electronic form, primarily through a web page or social media, where the coupons are displayed for the consumer to browse. However, text messaging and email can also be used to present to the consumer available digital coupons. To gain access to the digital coupon, the consumer traditionally may "clip" the coupon into their digital coupon account, at which point the digital coupon becomes associated to the consumer. When the consumer buys an associated product, at a participating retail location, the transaction system (POS) automatically applies the "clipped" coupon to the transaction. The system then automatically uses electronic means to reconcile the coupon for settlement, to ensure the retailer is correctly reconciled, by being paid the correct amount owed. Conventionally, digital coupons only work if the consumer electronically clips the coupon. This clip step provides assurance to the manufacture that the digital coupon is indeed generating demand. Otherwise, without this clip step, retailers could apply a digital coupon to a transaction, after the customer had already decided to buy the item. However, consumers often forget about visiting web pages or social media sites where they can clip such coupons. Many consumers also do not want to receive text messages, nor do they want to receive email with digital coupon offers.

In one embodiment of Applicant's inventions, digital coupons create demand for the associated product, by making the consumer aware of the coupon, and also clip the coupon for future use. In one example, the retailer may label items at the store shelf, indicating that an associated digital coupon is available. On the label a barcode or identifier may be printed. The consumers, while shopping the store, can clearly see which items have an associated digital coupon and thus are encouraged to buy the item, thereby creating demand. Using their smartphone, and/or a smart phone app, the consumer scans the digital coupon label, and by doing so, clips the digital coupon to their electronic account, as opposed in some examples to an external digital coupon wallet or account. The customer may now checkout with the associated item, being sure to associate themselves to the transactions by means used by the retailer to specifically associate the customer to their specific transactions. Once the customer is associated at the POS, the transaction system (POS) will apply the digital coupon that was previously scanned, if the customer purchases the item which is linked to the digital coupon. This application improves the shopping experience and linkage of digital coupons because the consumer, while shopping in the store, can clearly see which items have associated digital coupons and they can easily clip digital coupons by scanning the associated digital coupon shelf label. This creates a more likelihood the consumer will purchase the item and use the coupon because they are in the store when the coupon is "clipped" or added to a coupon listing obtained in-store. It does not require that the customer receive email or text coupon offers, which they often eventually elect out of receiving. It does not require the customer to go to a specific web site, or social media site, to learn about new coupons and to clip the coupon for their next store visit, which may or may not occur. It allows the manufacture to create demand for their products, while the consumer is actually shopping in the store location. In some examples, the invention may be considered a method of improving in-store digital coupon acquisition and usage.

In operation, the consumer may, in certain examples, load a smartphone app used for scanning digital coupons. The app may be associated directly with the point-of-sale system and in other examples may be an outside provided application. The retailer may place a shelf label on each coupon item in the store indicating that the item has an available digital coupon. The shelf label may include a barcode which can be scanned by the consumer using their smartphone, instantaneously, in-store, making the e-coupons clippable instantly at the product location. The consumer, in some examples, use their smartphone and special app to scan the digital coupon shelf label. In other examples, a consumer may use their smart phone and special app to scan the actual item barcode in the store for associated coupons. Still in other examples, the consumer's smart phone and a special coupon app may detect the localized presence of an RFID, or other radio or light signal, and display the digital coupon on the phone, and the consumer may then select/clip the coupon. The coupon app may be associated with the POS system, may be closed loop in the POS system, and/or may be a third-party coupon app. All of these examples, allow the coupon to be accessible and/or clipped at the product for purchase, in-store.

Some examples include where the Smartphone app may communicate a scan to a digital coupon service, indicating the consumer has clipped a coupon. In other examples, the smart phone app may detect that the item scanned as an associated digital coupon and communicates to the digital coupon service, indicating the customer has clipped the coupon. Other examples include where the smart phone app detects the associated digital coupon has been selected by the consumer and communicates to the digital coupon service, indicating the customer has clipped the coupon.

At the checkout, the consumer may associate themselves to the transaction. During the checkout the customer may purchase the item/product associated with the scanned Digital coupon. The checkout system may detect that the associated customer is buying the associated item. The checkout system may detect that the associated item and customer has a corresponding clipped coupon. The checkout system may apply the clipped coupon to the transaction, thereby reducing the amount of the associated item, by the coupon amount. The checkout system may automatically apply the clipped coupon to the transaction for a discount if the product appears in the transaction checkout listing. The checkout system may automatically disable the clipped coupon if the customer leaves the store without utilizing the coupon on the associated product during that particular shopping trip. It may detectable on the app when the consumer leaves the store.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A checkout system comprising:
   a checkout kiosk having a housing, a customer interface and a customer unloading station,
   wherein the checkout kiosk is a self-checkout kiosk including a portal scanner and a pay station,
   a point-of-sale system having a microprocessor and memory operatively associated with one another to identify products being purchased, payments tendered therefor and to store transaction information,
   the microprocessor having an electronic coupon rules engine with programming configured to allow point-of-sale system recognition and application of electronic coupons internally to the point-of-sale checkout system and redemption of the electronic coupons by the customer at the kiosk without requiring a scan-able artifact of the coupon,
   wherein the electronic coupon rules engine further includes a relational module that associates an internally recognized electronic coupon selection with a customer record to create a coupon association and detachment record for a customer within the point-of-sale system so that the customer may select an associated coupon from the associated coupon selection at a check out transaction at the checkout kiosk and the point-of-sale system will utilize the associated coupon by applying the associated coupon to the checkout at the checkout transaction,
   a social sharing option associated with the checkout system,
   a publication issued by the retailer, the publication including a social sharing embedded link, and
   a trigger in communication with both the electronic coupon rules engine and the social sharing option, wherein a customer selection of an embedded link in a publication triggers a generation of an electronic coupon and associates that electronic coupon as an associated coupon in a customer account.

2. The system of claim 1 including an e-coupon distribution system.

3. The system of claim 2 including an e-coupon redemption controller.

4. The system of claim 3 including a series of coupon triggers.

5. The system of claim 4 wherein the coupon triggers are optionally configurable by the retailer or the customer.

6. The system of claim 5 including an in-store identifier, linking to a coupon, associated proximally to the item for purchase.

7. A closed-loop system for managing electronic coupons, comprising:
   a checkout kiosk having a housing, a customer interface and a customer unloading station, wherein the checkout kiosk is a self-checkout kiosk including a portal scanner and a pay station,
   a POS checkout system having a store database, wherein the store database includes a transactions function, a customer record function and an e-coupon function,
   an electronic coupon rules engine in communication with the POS checkout system for executing electronic coupon triggers and to associate an electronic coupon with a consumer account within the POS system, wherein the engine is configured to internally monitor the applicability of the associated electronic coupon to the consumer account,
   a communication component for informing a consumer about an associated electronic coupon, and
   a redemption component for applying the electronic coupon to a consumer transaction at the kiosk,
   wherein the closed-loop system is adapted to allow a point-of-sale system to:
     generate an electronic coupon, associate the electronic coupon with a customer profile,
     store the electronic coupon for use by the customer during a transaction, remove the electronic coupon from the customer profile, and
     activate the electronic coupon when selected by a user during the transaction so that a coupon discount is applied to the transaction based upon the electronic coupon,
   a social sharing option associated with the closed-loop system,
   a publication issued by the retailer, the publication including a social sharing embedded link, and
   a trigger in communication with both the electronic coupon rules engine and the social sharing option, wherein a customer selection of an embedded link in a publication triggers a generation of an electronic coupon and associates that electronic coupon as an associated coupon in a customer account.

8. The system of claim 7 wherein the checkout system is a hybrid checkout system.

9. A method for providing electronic coupons in-store in proximity to an item for purchase in a point-of-sale closed-loop checkout system, comprising:
   making at least one checkout kiosk available to a customer for completing a customer retail transaction,
   creating electronic coupons originating from and generated within the point-of-sale system that are applicable to a customer transaction,
   selecting electronic coupon triggers,
   placing electronic coupons in-store near an associated item for purchase,
   allowing customer to clip the electronic coupons,
   attaching electronic coupons to consumer accounts in a POS system, activating an attached electronic coupon to provide a discount to a consumer based upon a customer election of the electronic coupon during a transaction, and removing ineligible coupons from customer accounts, incorporating a social sharing option associated with the closed-loop checkout system, issuing a publication by the retailer, the publication including a social sharing embedded link, and providing a trigger in communication with both the electronic coupon rules engine and the social sharing option, wherein a customer selection of an embedded link in a publication triggers a generation of an electronic coupon and associates that electronic coupon as an associated coupon in a customer account.

10. The method of claim 9 including accumulating a consumer's historical transactions as a relational database.

11. The method of claim 10 including comparing a consumer's historical transactions against the electronic coupon trigger rules.

12. The method of claim 11 including allowing consumers to control options for receiving electronic coupons.

13. The method of claim 12 including adding a communication between the closed-loop electronic coupon system and a third party electronic coupon system.

14. The method of claim 13 including monitoring within the point-of-sale system the applicability of the associated electronic coupons to a customer account.

15. The method of claim 14 including associating coupons with customer accounts through an electronic rules engine.

* * * * *